United States Patent
Otanez

(10) Patent No.: US 9,285,031 B1
(45) Date of Patent: Mar. 15, 2016

(54) METHOD AND APPARATUS TO CONTROL A CONTINUOUSLY VARIABLE TRANSMISSION

(71) Applicant: GM GLOBAL TECHNOLOGY OPERATIONS LLC, Detroit, MI (US)

(72) Inventor: Paul G. Otanez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/541,906

(22) Filed: Nov. 14, 2014

(51) Int. Cl.
| | |
|---|---|
| *G06F 17/00* | (2006.01) |
| *F16H 61/662* | (2006.01) |
| *F16H 9/04* | (2006.01) |
| *F16H 59/38* | (2006.01) |
| *F16H 59/14* | (2006.01) |
| *F16H 63/24* | (2006.01) |

(52) U.S. Cl.
CPC ............ *F16H 61/66272* (2013.01); *F16H 9/04* (2013.01); *F16H 59/14* (2013.01); *F16H 59/38* (2013.01); *F16H 63/24* (2013.01); *F16H 2059/148* (2013.01); *F16H 2710/04* (2013.01); *F16H 2710/24* (2013.01)

(58) Field of Classification Search
None
See application file for complete search history.

(56) References Cited

U.S. PATENT DOCUMENTS

| | | | |
|---|---|---|---|
| 6,219,607 B1 * | 4/2001 | Piepenbrink et al. ........... | 701/51 |
| 6,219,608 B1 * | 4/2001 | Abo et al. ........ | 701/51 |
| 6,243,638 B1 * | 6/2001 | Abo et al. ........ | 701/51 |
| 6,387,009 B1 * | 5/2002 | Haka ................ | 476/11 |
| 6,597,977 B1 * | 7/2003 | Danz et al. ........ | 701/51 |
| 7,197,385 B2 * | 3/2007 | Reuschel ......... | 701/51 |
| 7,885,747 B2 * | 2/2011 | Miller et al. ........ | 701/51 |
| 8,221,286 B2 * | 7/2012 | Van Der Noll ........ | 477/44 |
| 8,914,202 B2 * | 12/2014 | Lee ................ | 701/51 |
| 2005/0251315 A1 * | 11/2005 | Tanaka et al. ........ | 701/51 |
| 2012/0090937 A1 | 4/2012 | Samie et al. | |
| 2013/0130863 A1 | 5/2013 | Xu et al. | |
| 2014/0074366 A1 | 3/2014 | Cui et al. | |

* cited by examiner

*Primary Examiner* — Dirk Wright
(74) *Attorney, Agent, or Firm* — Quinn Law Group, PLLC

(57) ABSTRACT

A method for controlling a variator of a continuously variable transmission includes combining, by a controller, a periodically repeating excitation signal and a desired variator speed ratio signal. A variator ratio derivative is determined based upon the desired variator speed ratio signal combined with the excitation signal. A variator control parameter is determined based upon the variator ratio derivative. The variator control parameter is sent to the controller for controlling the variator in response thereto.

16 Claims, 1 Drawing Sheet

METHOD AND APPARATUS TO CONTROL A CONTINUOUSLY VARIABLE TRANSMISSION

TECHNICAL FIELD

This disclosure relates to a continuously variable transmission for a vehicle powertrain, and a method and control routine associated therewith.

BACKGROUND

Powertrains having an internal combustion engine coupled to a continuously or infinitely variable transmission (CVT) may be employed to provide tractive effort in vehicles. A CVT is capable of continuously changing an input/output speed ratio over a range between a minimum (underdrive) ratio and a maximum (overdrive) ratio, thus permitting infinitely variable selection of engine operation that achieves a preferred balance of fuel consumption and engine performance in response to an operator torque request.

Known belt-type continuously variable transmissions include two pulleys, each having two sheaves. A belt runs between the two pulleys, with the two sheaves of each of the pulleys sandwiching the belt therebetween. Frictional engagement between the sheaves of each pulley and the belt couples the belt to each of the pulleys to transfer torque from one pulley to the other. One of the pulleys may function as a drive, primary or input pulley so that the other pulley, i.e., a driven, secondary or output pulley can be driven. The gear ratio is the ratio of the torque of the driven pulley to the torque of the drive pulley. The gear ratio may be changed by moving the two sheaves of one of the pulleys closer together and the two sheaves of the other pulley farther apart, causing the belt to ride higher or lower on the respective pulley.

Known toroidal continuously variable transmissions include discs and roller mechanisms that transmit power between the discs. The toroidal continuously variable transmission includes at least one input disc, connected to the engine, and one output disc operatively connected to the transmission output. The input disc and output disc define a cavity therebetween. The cavity defines a toroidal surface. The roller mechanism is placed within the cavity and is configured to vary the torque transmission ratio as the roller mechanism moves across the toroidal surface.

SUMMARY

A method for controlling a variator of a continuously variable transmission includes combining, by a controller, a periodically repeating excitation signal and a desired variator speed ratio signal. A variator ratio derivative is determined based upon the desired variator speed ratio signal combined with the excitation signal. A variator control parameter is determined based upon the variator ratio derivative. The variator control parameter is sent to the controller for controlling the variator in response thereto.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
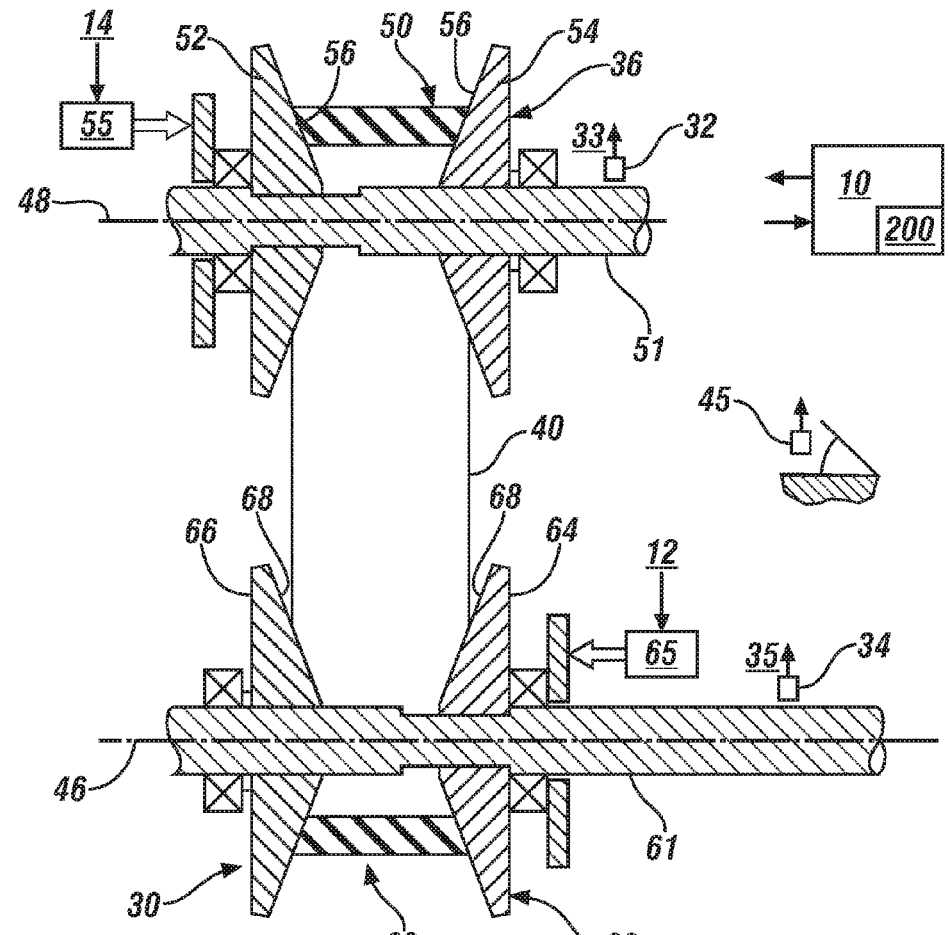
FIG. 1 schematically illustrates elements of a variator of a belt-type continuously variable transmission (CVT) having an improved control routine, in accordance with the disclosure.

Referring now to the drawings, wherein the depictions are for the purpose of illustrating certain exemplary embodiments only and not for the purpose of limiting the same, FIG. 1 schematically illustrates elements of a variator 30 of a belt-type continuously variable transmission (CVT) 100 that is advantageously controlled by a controller 10 that is capable of executing a control routine 200 described with reference to FIG. 2. The variator 30 transfers torque between a first rotating member 51 and a second rotating member 61, with the first and second rotating members 51, 61 each rotatably coupled to any one of a primary power source including either an internal combustion engine or an electric motor/generator, and an output member in the form of a planetary gear set of a transmission or an output member coupled to a driveline for delivering tractive torque to vehicle drive wheels. The first rotating member 51 is nominally referred to herein as an input member, and the second rotating member 61 is nominally referred to herein as an output member.

The variator 30 includes a first, or primary pulley 36, a second, or secondary pulley 38 and flexible continuous rotatable device 40 that rotatably couples the first and second pulleys 36, 38 to transfer torque therebetween. The first pulley 36 rotatably attaches to the input member 51 and the second pulley 38 rotatably attaches to the output member 61, and the rotatable device 40 is adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. The continuous rotatable device 40 can be a belt, a chain, or another suitable flexible continuous device.

The first pulley 36 is split perpendicular to the first axis 48 to define an annular first groove 50 that is formed between a moveable sheave 52 and a stationary sheave 54. The moveable sheave 52 axially moves or translates along the first axis 48 relative to the stationary sheave 54. For example, the moveable first sheave 52 may be attached to the input member 51 via a splined connection, thereby allowing axial movement of the moveable first sheave 52 along the first axis 48. The stationary first sheave 54 is disposed opposite the moveable first sheave 52. The stationary first sheave 54 is axially fixed to the input member 51 along the first axis 48. As such, the stationary first sheave 54 does not move in the axial direction of the first axis 48. The moveable first sheave 52 and the stationary first sheave 54 each include a first groove surface 56. The first groove surfaces 56 of the moveable first sheave 52 and the stationary first sheave 54 are disposed opposite each other to define the annular first groove 50 therebetween. The opposed first grooved surfaces 56 preferably form an inverted frustroconical shape such that a movement of the moveable first sheave 52 towards the stationary first sheave 54 increases an outer pulley diameter of the annular first groove 50. An actuator 55 is arranged with the first pulley 36 to control an axial position of the moveable first sheave 52 in response to a first signal 14, including urging the moveable first sheave 52 towards the stationary first sheave 54. In one embodiment, the actuator 55 is a hydraulically-controlled device and the first signal 14 is a hydraulic pressure signal.

The second pulley 38 is split perpendicular to the second axis 46 to define an annular second groove 62 therebetween. The annular second groove 62 is disposed perpendicular to the second axis 46. The second pulley 38 includes a moveable sheave 64 and a stationary sheave 66. The moveable sheave 64 axially moves or translates along the second axis 46 relative to the stationary sheave 66. For example, the moveable second sheave 64 may be attached to the output member 61 via a splined connection, thereby allowing axial movement of the moveable second sheave 64 along the second axis 46. The stationary second sheave 66 is disposed opposite the moveable second sheave 64. The stationary second sheave 66 is axially fixed to the output member 61 along the second axis 46. As such, the stationary second sheave 66 does not move in the axial direction of the second axis 46. The moveable second sheave 64 and the stationary second sheave 66 each include a second groove surface 68. The second groove surfaces 68 of the moveable second sheave 64 and the stationary second sheave 66 are disposed opposite each other to define the annular second groove 62 therebetween. The opposed second grooved surfaces 68 preferably form an inverted frustroconical shape such that a movement of the moveable second sheave 64 towards the stationary second sheave 66 increases an outer pulley diameter of the annular second groove 62. An actuator 65 is arranged with the second pulley 38 to control an axial position of the moveable second sheave 64 in response to a second signal 12, including urging the moveable second sheave 64 towards the stationary second sheave 66. In one embodiment, the actuator 65 is a hydraulically-controlled device and the second signal 12 is a hydraulic pressure signal. A ratio of the outer pulley diameter of the first pulley 36 and the outer pulley diameter of the second pulley 38 defines a transmission torque ratio. Other elements, such as clutch assemblies in the form of selectable one-way clutches and the like may be deployed between the variator 30 and other powertrain and driveline components and systems.

The controller 10 for monitor sensor inputs and controlling operation of powertrain elements including the CVT 100 may be positioned external thereto. Driver input devices such as an accelerator pedal and associated accelerator pedal position sensor 45 can be monitored to determine an operator torque request. Various sensors are suitably positioned for sensing and providing signals. An input speed sensor 32 may be mounted near the input member 51 to generate an input speed signal 33. A variator output speed sensor 34 may be mounted near the output member 61 to generate an output speed signal 35. The variator input speed sensor 32 and variator output speed sensor 34 may be any suitable rotation position/speed sensing device, such as a Hall-effect sensor. The input speed signal 33 and the output speed signal 35 may be combined in the controller 10 to provide an actual variator speed ratio. Although the signals from the sensors are shown as discrete lines, they may be included on a common bus, sent wirelessly or via multiple conductor cables or the like for use in the present disclosure.

The controller 10 may include digital processing capability that includes executable control routines that determine control signals for actuators based on input signals such as vehicle speed and engine torque. The controller 10 and similar terms control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds. Communications between controllers and between controllers, actuators and/or sensors may be accomplished using a direct wired link, a networked communications bus link, a wireless link or any another suitable communications link. The CVT control routine 200 is implemented as one or a plurality of elements of the controller 10 shown with reference to FIG. 1, with a detailed description provided in FIG. 2.

Figure 2:
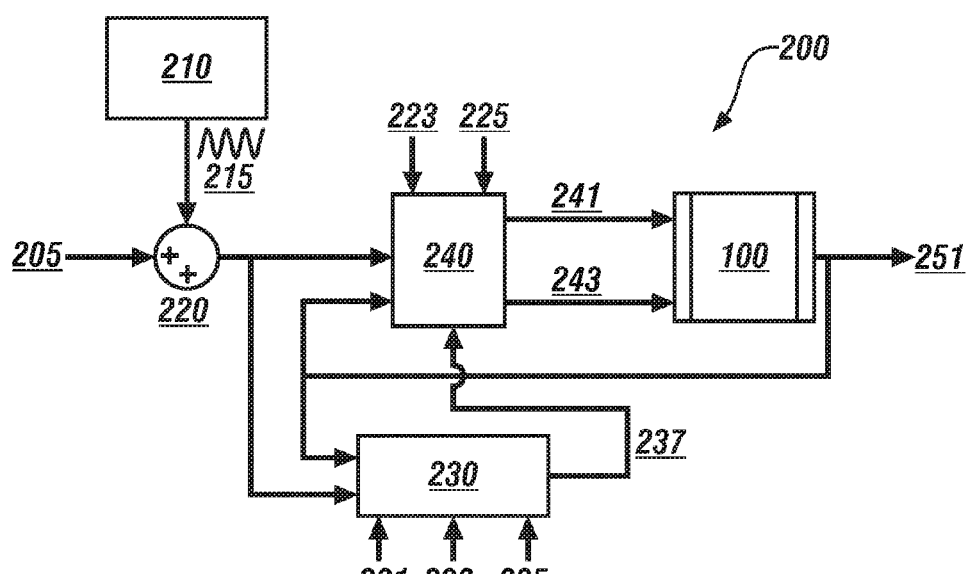
FIG. 2 schematically shows a block diagram of a CVT control routine that includes introducing a repeating signal to a variator reference speed ratio to control a CVT system, in accordance with the disclosure.

FIG. 2 schematically shows a block diagram of a CVT control routine 200 that can be employed in controlling a CVT system, e.g., an embodiment of the CVT 100 shown with reference to FIG. 1. Overall, the CVT control routine 200 includes introducing a periodically repeating signal to the variator reference speed ratio and decomposing the result into an analytical expression. The periodically repeating signal introduced to the variator reference speed ratio is sinusoidal in one embodiment and as described herein, but may take any suitable form to determine a ratio change coefficient k for controlling operation of the CVT 100 employing the CVT control routine 200 described herein.

The CVT control routine 200 analytically computes a variator ratio derivative $\dot{r}$ which is employed with a shift force Fshift to calculate the ratio change coefficient k for controlling operation of the CVT 100 in response to an operator torque request. The sinusoidal excitation to the speed or torque ratio of the variator of the CVT 100 is introduced to calculate the ratio of ratio change rate and the balance of primary/secondary pulley forces for different conditions, allowing the variator ratio derivative to be determined without relying on noisy differentiation from digital signal filters and/or estimators. This is accomplished by advantageously calculating the variator ratio derivative of the periodically repeating excitation signal employing the frequency composition of the measured ratio. In one embodiment the frequency composition of the measured ratio is obtained using a discrete Fourier transform (FFT). Alternatively, a plurality of sinusoids at difference frequencies and phases is used. This calculation is then divided by the shift force Fshift as a function of the measured or calculated primary and secondary forces at the pulleys of the variator. The division yields a torque or speed ratio rate coefficient that is characterized for different operation conditions of the variator that include, but are not limited to speed ratio, input/output speed, primary/secondary forces, torque ratio coefficient, temperature, friction coefficient between belt/chain and pulleys, life or purity of the transmission fluid, among other conditions.

The CVT control routine 200 includes a signal generator 210, a ratio change coefficient generator 230 and a controller 240 to determine a primary pressure command 241 and a secondary pressure command 243, both which are employed to control operation of the CVT 100 in response to a desired variator speed ratio (VSR) 205.

A CVT control parameter in the form of the desired VSR 205 is determined based upon monitored and estimated operating conditions related to vehicle speed and engine torque.

The desired VSR 205 is a ratio between transmission input speed and transmission output speed that is employed in controlling pressures of one or both the primary pulley 36 and the secondary pulley 38 of the CVT 100. Controlling pressures of one or both the primary pulley 36 and the secondary pulley 38 of the CVT 100 described with reference to FIG. 1 can be achieved by controlling first and second signals 14, 12 to apply requisite pressures to the first and second actuators 55, 65 to effect the desired VSR 205, wherein the requisite pressures are preferably in the form of the primary pressure command 241 and the secondary pressure command 243.

The sinusoidal signal generator 210 generates a sinusoidal VSR signal 215 that is added to the desired VSR 205 employing adder 220 to generate a combined VSR signal 221, wherein the sinusoidal VSR signal 215 has a magnitude that is +/−about 5% of a maximum value for the desired VSR 205 at a known frequency $f_1$ in one embodiment. The combined VSR signal 221 and a presently measured actual variator speed ratio 251 are provided as inputs to the ratio change coefficient generator 230 and the controller 240.

The ratio change coefficient generator 230 employs one of the combined VSR signal 221 or the presently measured actual variator speed ratio 251 to periodically determine and update a value for a ratio change coefficient k 237 based upon monitored CVT operating signals including a primary pulley force or pressure $F_{prim}$ 231, a secondary pulley force or pressure $F_{sec}$ 233 that corresponds to a commanded secondary shift force for controlling the variator and a ratio change coefficient kpks 235, which represents a ratio of $F_{prim}$ and $F_{sec}$ that accounts for force from hydraulic pressure and force from centrifugal pressure and spring force. The ratio change coefficient kpks 235 is related to variator speed ratio and a variator torque capacity ratio, and is dependent upon input torque, input speed, output speed, transmission fluid temperature, transmission fluid quality and other factors.

One of the combined VSR signal 221 and the presently measured actual variator speed ratio 251 can be employed to develop an equation in the following form using fast Fourier transform (FFT) analysis.

$$r = a_1 \cos(2\pi f_1 t + \phi_1) + a_2 \cos(2\pi f_2 t + \phi_2) + \ldots \quad [1]$$

wherein:

r represents a selected one of either the combined VSR signal 221 or the presently measured actual variator speed ratio 251;

$a_1, a_2, \ldots$ are coefficients associated with magnitudes of the related signals;

$f_1, f_2, \ldots$ are frequencies of the related signals, and $\phi_1, \phi_2, \ldots$ are phase shifts associated with the related signals.

The calculated ratio of ratio change rate and a balance of primary and secondary pulley forces can be determined for different conditions by taking advantage of the fact that the excitation, e.g., the combined VSR signal 221 has a sinusoidal component. This includes determining a derivative of the combined VSR signal 221, i.e., determining a variator ratio derivative $\dot{r}$. The frequency composition of the selected ratio is employed to calculate the variator ratio derivative $\dot{r}$, which takes the following form:

$$\dot{r} = k(Fshift) \quad [2]$$

$$\dot{r} = k(F_{prim} - kpksF_{sec}) \quad [3]$$

$$k = \frac{\dot{r}}{(F_{prim} - kpksF_{sec})} \quad [4]$$

wherein:

$F_{prim}$ is the primary pulley force or pressure 231;

$F_{sec}$ is the secondary pulley force or pressure 233, which corresponds to a commanded secondary shift force for controlling the variator;

kpks is an empirical coefficient 235, which represents a ratio of $F_{prim}$ and $F_{sec}$ that accounts for force from hydraulic pressure, force from centrifugal pressure and spring force; and k is the ratio change coefficient.

The variator ratio derivative $\dot{r}$ can be determined as a derivative of Eq. 1, above, resulting in the following.

$$\dot{r} = a_1 2\pi f_1 \sin(2\pi f_1 t + \phi_1) + a_2 2\pi f_2 \cos(2\pi f_2 t + \phi_2) + \ldots \quad [5]$$

In one embodiment the frequency composition is obtained using a discrete Fourier transform (FFT). Alternatively, a bank of sinusoids at difference frequencies and phases and correlation is used to determine the frequency composition. This calculation is divided by the shift force as a function of the measured or calculated primary and secondary forces at the pulleys of the variator to determine the ratio change coefficient k 237, which is provided as input to controller 240.

Controller 240 determines the primary pressure command 241 and secondary pressure command 243, both which are employed to control operation of the CVT 100 in response to the desired VSR command 205, a commanded engine torque 223, an operator torque request 225 and the presently measured actual variator speed ratio 251 that is determined based upon measured speeds from the from the variator of the CVT 100 including the input speed signal 33 and the output speed signal 35. The operator torque request 225 is based upon information including driver information, such as the operator torque request via the accelerator pedal position sensor 45 as shown. Other inputs may include vehicle information such as the present vehicle speed.

Controller 240 determines the primary pressure command 241 and secondary pressure command 243 to control actuators of the CVT 100 based upon the variator ratio derivative $\dot{r}$ using the following relationship:

$$\dot{r} = k(VSR, \omega_p) * [F_{prim} - kpks(VSR, TCR)F_{sec}] \quad [6]$$

wherein:

k is the ratio change coefficient 237;

kpks is the ratio change coefficient 235 related to variator speed ratio and a variator torque capacity ratio, and is dependent upon input torque, input speed, output speed, transmission fluid temperature, transmission fluid quality and other factors;

VSR is the desired VSR command 205;

$\omega_p$ is the input speed; and

TCR is a torque capacity factor for the CVT.

The necessary adjustments needed to effect the primary pressure command 241 and the secondary pressure command 243 are employed to control the CVT 100. This includes the controller 10 sending first and second signals 14, 12 to drive the first and second actuators 55, 65 based thereon to move the moveable sheave 52 of the first pulley 36 and the moveable sheave 64 of the second pulley 38 as described above. This movement causes a change that causes a change in torque transfer across the variator of the CVT 100.

Alternatively, the presently measured actual variator speed ratio 251 can be employed by the ratio change coefficient generator 230 to periodically determine and update a value for the ratio change coefficient k 237 based upon monitored CVT operating signals, with controller 240 determining the primary pressure command 241 and secondary pressure command 243 to control operation of the CVT 100 in response to the desired VSR command 205, the commanded engine torque 223, the operator torque request 225 and the presently measured actual variator speed ratio 251.

The CVT control routine 200 described herein uses primary and secondary pressure measurements to determine a relationship between shifting forces and ratio change rate at different conditions. The associated algorithm includes introducing a sinusoidal excitation to the speed or torque ratio of the variator of the CVT in order to calculate the ratio of ratio rate and balance of primary/secondary pulley forces for different conditions. Thus, the CVT control routine 200 determines a variator ratio derivative without relying on noisy differentiation from signal filters and estimators. This is accomplished by employing the frequency component inserted into the excitation signal that includes the desired speed ratio to calculate the variator ratio derivative. In one embodiment the frequency composition is obtained using a discrete FFT and in another a bank of sinusoids at difference frequencies and phases is used. This calculation is then divided by the force balance of the primary/secondary forces at the pulleys of the variator. The division yields a ratio rate coefficient that is characterized for different operation conditions of the variator. The benefits of the procedure are a simpler, more accurate, faster method to relate the ratio of ratio to the balance of primary and secondary forces in the variator of the CVT.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a variator of a continuously variable transmission, comprising:
   combining, by a controller, a periodically repeating excitation signal and a desired variator speed ratio signal;
   determining a variator ratio derivative based upon the desired variator speed ratio signal combined with the excitation signal;
   determining a variator control parameter based upon the variator ratio derivative; and
   sending the variator control parameter to the controller and controlling the variator in response thereto.

2. The method of claim 1, wherein combining the periodically repeating excitation signal and the desired variator speed ratio signal comprises combining a sinusoidal excitation signal and the desired variator speed ratio signal.

3. The method of claim 2, wherein combining the sinusoidal excitation signal comprises introducing a sinusoidal signal having a magnitude that is +/−5% of a maximum value for the desired variator speed ratio signal into the desired variator speed ratio signal.

4. The method of claim 1, wherein determining a variator ratio derivative based upon the desired variator speed ratio signal combined with the excitation signal comprises taking a derivative with respect to time of the desired variator speed ratio signal combined with the excitation signal.

5. The method of claim 1, wherein the variator comprises a belt-drive variator including first and second pulleys rotatably coupled via a rotatable device including a first actuator operably connected to a moveable sheave of the first pulley and a second actuator operably connected to a moveable sheave of the second pulley; and
   wherein sending the variator control parameter to the controller and controlling the variator in response thereto includes controlling the first and second actuators to control axial positions of the moveable sheaves of the first and second pulleys of the variator.

6. The method of claim 1, further comprising determining the desired variator speed ratio in response to an operator torque request.

7. The method of claim 6, further comprising determining the desired variator speed ratio in response to the operator torque request and a torque output from the continuously variable transmission.

8. A method for controlling a variator of a continuously variable transmission, comprising:
   determining a command for controlling the variator in response to an operator torque request and a torque output from the continuously variable transmission;
   combining, by a controller, a periodically repeating excitation signal and the command for controlling the variator;
   determining a variator ratio derivative based upon the command for controlling the variator combined with the excitation signal;
   determining a control parameter for the variator based upon the variator ratio derivative; and
   sending the control parameter to the controller and controlling the variator in response thereto.

9. The method of claim 8, wherein combining the periodically repeating excitation signal and the desired variator speed ratio signal comprises combining a sinusoidal excitation signal and the desired variator speed ratio signal.

10. The method of claim 9, wherein combining the sinusoidal excitation signal comprises introducing a sinusoidal signal having a magnitude that is +/−5% of a maximum value for the desired variator speed ratio signal into the desired variator speed ratio signal.

11. The method of claim 8, wherein determining a variator ratio derivative based upon the command for controlling the variator combined with the excitation signal comprises taking a derivative with respect to time of the command for controlling the variator combined with the excitation signal.

12. The method of claim 8, wherein the variator comprises a belt-drive variator including first and second pulleys rotatably coupled via a rotatable device including a first actuator operably connected to a moveable sheave of the first pulley and a second actuator operably connected to a moveable sheave of the second pulley; and
   wherein sending the control parameter to the controller and controlling the variator in response thereto comprises controlling the first and second actuators to control axial positions of the moveable sheaves of the first and second pulleys of the variator.

13. A method for controlling a variator of a continuously variable transmission, comprising:
   determining a command for controlling the variator in response to an operator torque request and a torque output from the continuously variable transmission;
   determining a presently measured actual variator speed ratio;
   determining a variator ratio derivative based upon the presently measured actual variator speed ratio;
   determining a control parameter for the variator based upon the variator ratio derivative; and sending the variator control parameter to the controller and controlling the variator in response thereto.

14. The method of claim 13, wherein determining a variator ratio derivative based upon the presently measured actual variator speed ratio comprises taking a derivative with respect to time of the presently measured actual variator speed ratio.

15. The method of claim 13, further comprising determining the desired variator speed ratio in response to the operator torque request.

16. The method of claim 13, wherein the variator comprises a belt-drive variator including first and second pulleys rotatably coupled via a rotatable device including a first actuator operably connected to a moveable sheave of the first pulley and a second actuator operably connected to a moveable sheave of the second pulley; and wherein sending the variator control parameter to the controller and controlling the variator in response thereto comprises controlling the first and second actuators to control axial positions of the moveable sheaves of the first and second pulleys of the variator.

\* \* \* \* \*